Oct. 28, 1930.  F. D. POTTER  1,779,619
MULTIPLE AUTOMATIC TEMPERATURE RECORDING APPARATUS
Filed April 3, 1923  3 Sheets-Sheet 1
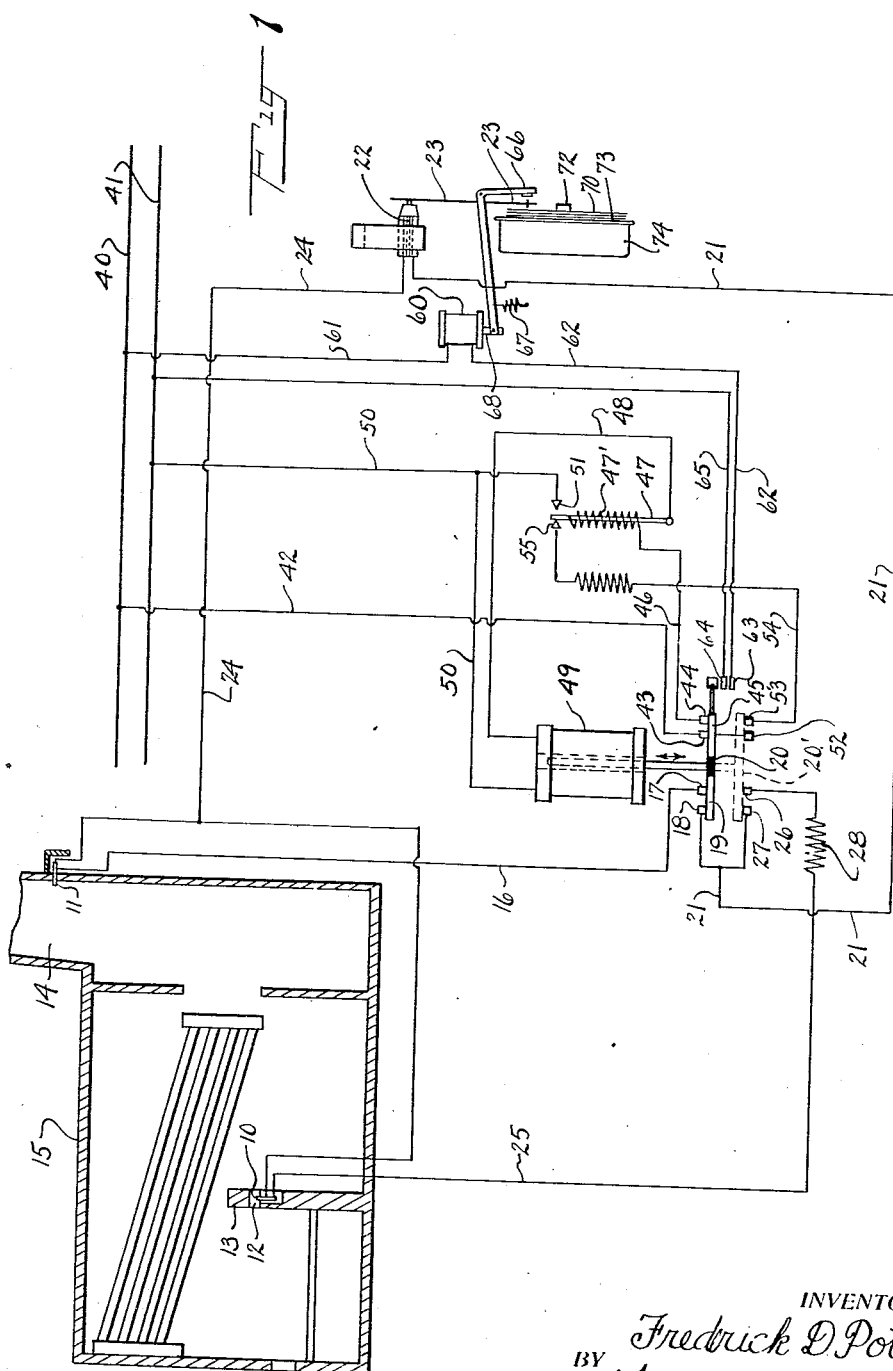
INVENTOR
Fredrick D Potter
BY H. H. Dyke
ATTORNEY Oct. 28, 1930.  F. D. POTTER  1,779,619
MULTIPLE AUTOMATIC TEMPERATURE RECORDING APPARATUS
Filed April 3, 1923  3 Sheets-Sheet 2
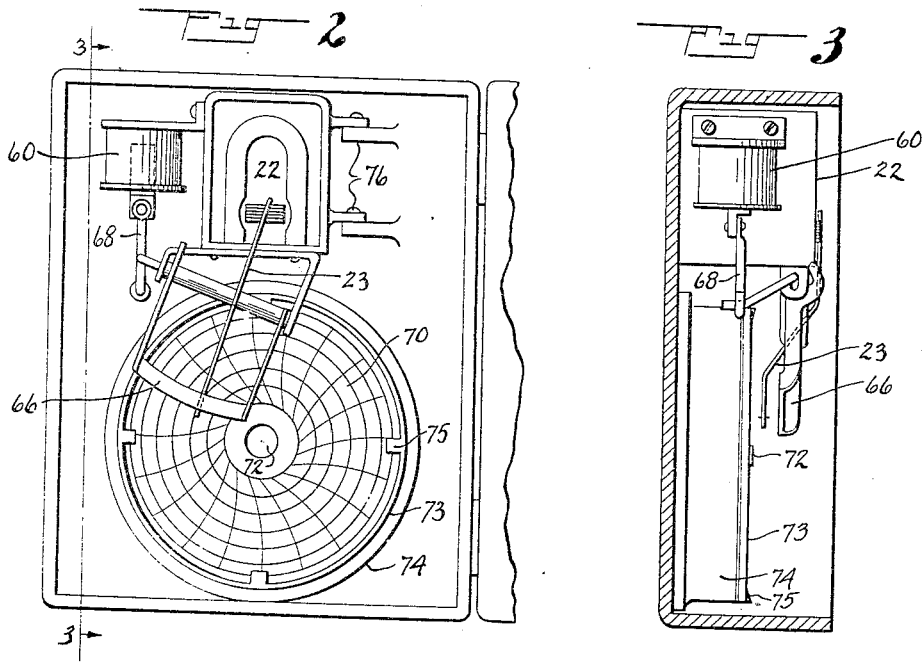
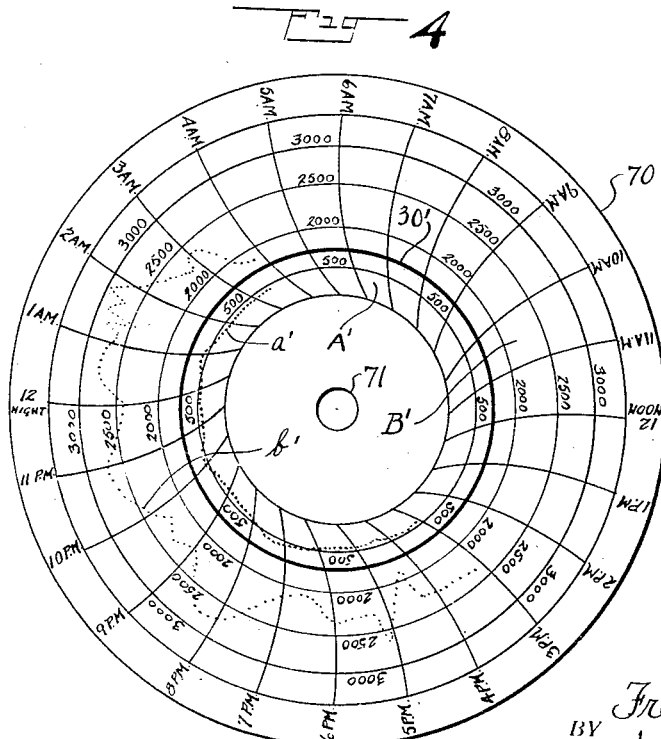
INVENTOR
Fredrick D. Potter
BY N. N. Dyke
ATTORNEY

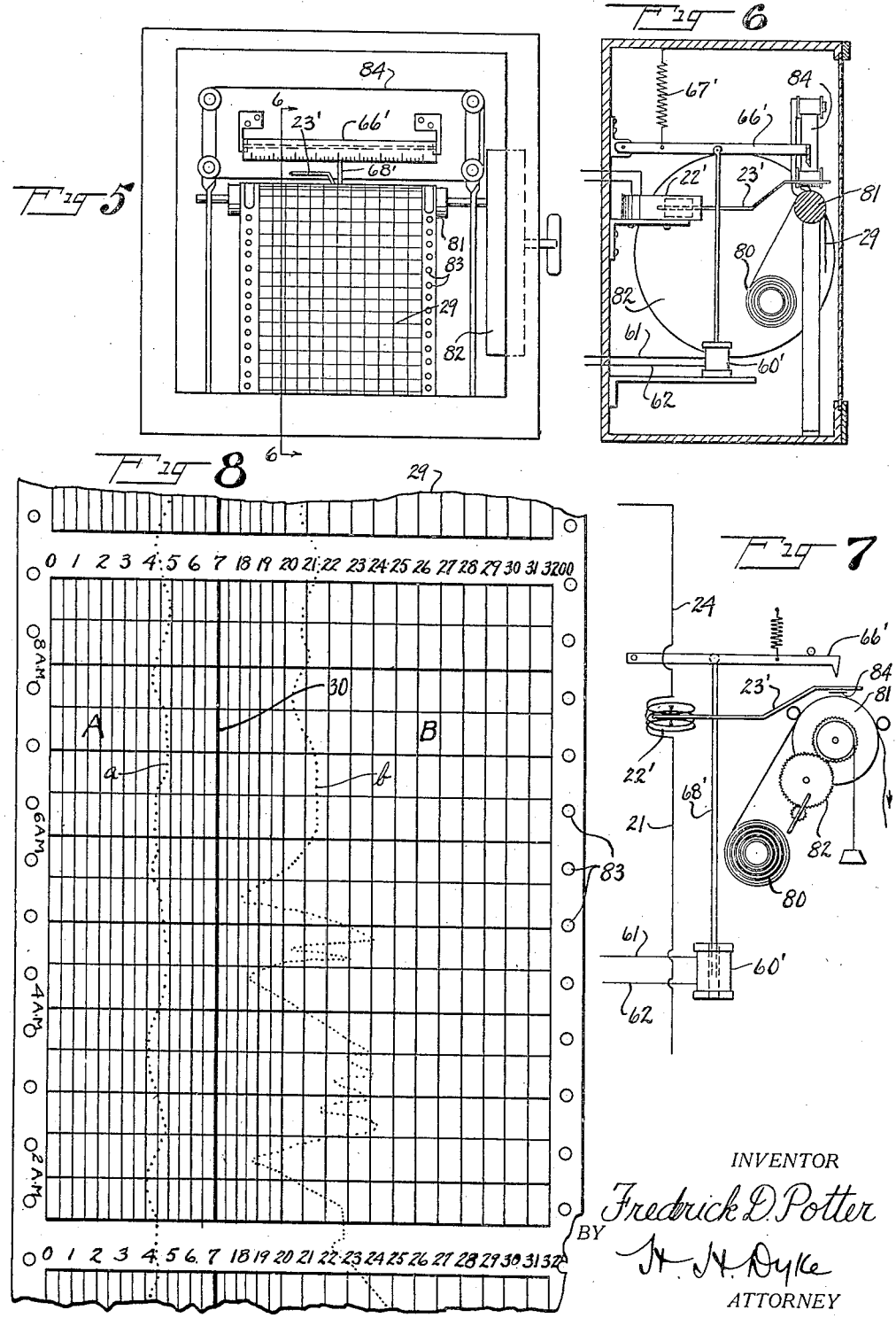

Patented Oct. 28, 1930

1,779,619

UNITED STATES PATENT OFFICE

FREDERICK D. POTTER, OF LINDEN, NEW JERSEY, ASSIGNOR TO COMBUSTION CONTROL COMPANY, INC., OF NEW YORK, N. Y., A CORPORATION OF NEW YORK

MULTIPLE AUTOMATIC TEMPERATURE-RECORDING APPARATUS

Application filed April 3, 1923. Serial No. 629,573.

My invention relates to a multiple automatic temperature recording apparatus and, while not limited thereto, is herein particularly described in connection with a steam boiler and its furnace, the recording apparatus being arranged to automatically provide manifold chart records of the firebox temperatures and of the temperature at the stack uptake, whereby the efficiency of combustion and of delivery of heat to make steam can be readily observed and manifold records made and kept. Two or more sets of temperatures may be recorded, two being referred to herein merely by way of example of multiple temperature records.

In the drawings, Fig. 1 is a principally diagrammatical view showing the application of apparatus in accordance with my invention for taking temperatures as above stated with respect to a steam boiler. Figs. 2 and 3 are front and side views respectively of the manifold recording device indicated in Fig. 1. Fig. 4 is a face view of a manifold record chart of the circular type used with the manifold recording device of Figs. 1, 2 and 3. Figs. 5 and 6 are front and side views respectively of a modified form of recording device using a straight lined chart. Fig. 7 is a principally diagrammatical view similar to the right hand portion of Fig. 1, but showing a connection with the straight sheet recording apparatus of Figs. 5 and 6. Fig. 8 is a face view of the chart used with the recording device of Figs. 5, 6 and 7.

Pyrometer couples 10 and 11 are located respectively in connection with a short circuit passage 12 through the bridge wall 13, and at the uptake of stack 14 of a boiler setting 15. Couple 11 at the stack uptake registers a much lower temperature than the couple 10, which registers temperatures representative of average firebox temperatures, and for couple 11 a circuit resulting in the direct registration of actual temperatures may be used. Such circuit includes wire 16, switch points 17 and 18 adapted to be connected by the conducting portion 19 of switch member 20, wire 21, galvanometer winding 22 (which actuates the light galvanometer needle 23) and return wire 24.

For couple 10 the circuit includes wire 25, switch points 26 and 27, also adapted to be connected by switch part 19, wire 21, galvanometer winding 22 and return wire 24, but is distinguished from the circuit for couple 11 by the inclusion at any suitable point, preferably in a portion of lead wire 25, of resistance 28. The circuit including this resistance is used, in connection with a special chart arrangement, to obtain a record of firebox temperatures on the same chart with the uptake temperature. Couple 10 is located at a point the temperature of which has a definite relation to the temperature of the firebox, the difference between the two ranging from about 700°–1000°. Consequently by the use of the resistance and of a suitably calibrated chart the actual temperature at the bridge wall is made to express on a chart the firebox temperature by adding the difference to the actual temperature and placing on the chart indicia expressing the sum instead of the actual temperature at the couple 10.

A chart 29 which may be used for this purpose is shown in Fig. 8. Space A at the left reading up to 700° F. is used for uptake temperatures, which seldom exceed 700° F. and which can be taken directly from couple 11 at the stack uptake. Space B separated from space A by line 30, is graduated from 1800° to 3200° F., which are about the outside limits in ordinary practice for firebox temperatures. (All temperatures referred to herein are Fahrenheit.) Record lines $a$ and $b$ are made as hereinafter described, line $a$ in space A being the record line for uptake temperature and line $b$ in space B that for the firebox temperature, and the making of both lines is controlled by the same galvanometer needle. The chart 29 is calibrated as shown with the temperature figures upset or increased 1000° at the transition from space A to space B in order that the indications in space B made from couple 10 will be recorded so as to indicate temperatures of the fire-box in the place of actual temperatures at the couple 10.

As already stated, line $a$ is the thermocouple temperature record line corresponding to temperatures at the location of couple 11, but it will be seen that if couple 10 were connected up in the same way as couple 11 the temperature indicated in region B on the chart would be that encountered at couple 10 in the by-pass 12, plus the 1000° in space B added in making up the chart. As the wiring for couple 10, however, includes the resistance 28, the actual indication is somewhat under 1000° above the temperature actually encountered in the by-pass 12, as, for example, if resistance 28 is sufficient to make the galvanometer needle indicate 200° under the normal indication without the resistance 28 in the circuit, the record line would be made at about 800° above the temperature encountered by couple 10 in by-pass 12.

It will be seen, therefore, that by marking up the chart lines in region B as described, and by introducing suitable resistance into the circuit for couple 10, provision can be made for tracing in line $b$ a temperature above that encountered by pyrometer couple 10, which is substantially the actual or average temperature of the firebox. The difference in temperature between the firebox and the by-pass 12 can be determined by comparison, as, for example, by observation of the firebox temperature (which is too high for pyrometer couples to stand up under) by means of a visual pyrometer and taking simultaneous pyrometer couple readings of the temperature in the by-pass 12. This difference is found in practice to be practically constant with any one given firebox installation, but will, of course, vary more or less in the case of a number of different installations.

Thus while, in the case of a single boiler, for example, the additional amount in which the temperature for couple 10 is to be increased in order to give firebox temperature can be taken care of by merely making additional charges in part B of a temperature chart and dispensing with the resistance 28, when it is desired to print up the charts in quantities to provide a universal chart for general use with many installations, each having its own varying additional corrections, it is found most practicable to mark the part B of the charts up to an extent greater than is actually needed, say 1000° F. as here illustrated, and take care of the variations from one setting to another by inserting for each case the necessary resistance 28 to bring the addition of the chart markings back to a sufficient extent to take care of the particular case. Thus if in one case the firebox temperature is found to average 900° F. above that of the by-pass couple, sufficient resistance 28 is included in the circuit to produce a reduction of 100° F., whereas with a boiler setting having, say 800° F. difference between firebox and by-pass, additional resistance is supplied to bring back the temperature indications a distance corresponding to 200° F. and in this way the same chart can be used for all cases with only the change in resistance for each installation. In other words, an arbitrary addition is made to the chart in region B, greater than the addition required to convert by-pass temperature into firebox temperature, and resistance 28 produces a suitable subtraction therefrom, and the two together make it possible to have a universal multiple temperature chart upon which both uptake and firebox temperatures are recorded.

The indicated arrangement for automatically securing a record as above described is shown diagrammatically in Fig. 1. The side 40 of the service line 40, 41 is connected by wire 42 to switch point 43, which is adapted to be connected to switch point 44 by the conducting portion 45 of switch member 20. From switch point 44 the wire 46 leads to a thermo-electric switch member 47 and thence through wire 48, solenoid 49 and wire 50 back to feed wire 41.

As the switch member 47 is heated it bends and makes contact with switch point 51, which is connected through wire 50 direct to feed wire, thereby short circuiting the solenoid 49, whereupon the switch member 20 is moved by gravity or otherwise into the position 20'. This opens the circuit for couple 11 and closes that for couple 10. It also opens the circuit including the switch points 43, 44 and the heating resistance coil 47' of switch 47 and brings switch point 52 connected to wire 42 into circuit with switch point 53 and wire 54 leading to switch point 55, but the circuit remains open at this point until the switch member 47 has cooled, bringing it into contact with switch point 55. When this contact is made solenoid 49 is again energized, the current passing through wires 42 and 54, switch member 47, wire 48, solenoid 49 and wire 50, resulting in the restoration of switch member 20 to the position shown in full lines, and this cycle is repeated indefinitely, the galvanometer circuit being shifted from couple 10 to couple 11 at intervals depending on the heating and cooling speed of the electro-thermal switch 47.

Movement of switch 20 is utilized to make and break a circuit arranged to secure a record of the positions of galvanometer needle 23.

In the form shown, the circuit of solenoid 60 includes wire 61 leading from feed wire 40, the solenoid coil, wire 62, switch points 63 and 64 and wire 65 leading back to feed wire 41. As the switch member 20 passes over switch points 63 and 64 in each direction this normally open circuit is momentarily closed and the spring retracted bar 66 actuated by solenoid 60 is caused to make a vigorous stroke carrying with it in the last part of the stroke the needle 23, so that the latter makes a record on any suitable device arranged in its path. The contact at 63, 64 being momentary, the bar 66 is immediately retracted by spring 67 and retreats, being thus taken out of contact with needle 23, leaving it free to swing under the influence of the galvanometer coil. Any suitable connection between bar 66 and the core of solenoid 60 may be used, that illustrated consisting of a link 68.

A vigorous manifolding stroke can thus be obtained and as many duplicate records made as desired. The recording devices may be of various forms. In Figs. 1, 2 and 3 apparatus is shown making use of the circular chart 70 shown in Fig. 4. These charts have a central hole 71 adapted to take over the centering pin 72 on disk 73, which is rotated as by the usual clockwork 74, and clamping fingers 75 are preferably provided to hold a plurality of chart sheets 70 on the disk 73. The charts may be made of thin paper and they may be separated by carbon sheets adapted to make a mark on the back of the chart, which will show through the chart, which is preferably of translucent material, or other marking means, such as a ribbon or the like, may be provided.

The galvanometer 22 is preferably mounted to swing as a whole at 76, the bar 66 carried thereby being temporarily detached from link 68 to enable free access to be had to the clock face disk 73, as for inserting or removing record charts. This chart has its subdivisions divided by line 30', space A', up to say 700° F., being adapted to receive a dotted line a' corresponding to uptake temperature and space B' from say 1800–3200° F. or higher being adapted to receive a dotted line b' for firebox temperature.

In Figs. 5, 6, 7 and 8 a straight lined chart 29 is shown with apparatus for recording thereon including the solenoid 60', galvanometer 22', needle 23', striking bar 66' and link 68'. In this case the chart is rolled on roller 80 and passes over roller 81 and is driven by clockwork 82, holes 83 being provided in the edge of the chart for driving purposes. A typewriter ribbon or the like 84 is provided for inking the chart, which is shown as a single chart, though manifolding may be done with this construction, if desired. The connections are the same as with the recording devices hereinbefore described. For convenience of representation the temperature lines on chart 29 have been shown equidistant, but it will be understood that when the galvanometer arm is relatively short the spacings between the temperature lines can be varied to accommodate its swing.

The operation of the device is simple and automatic. By means of the thermo-electric switch or equivalent devices operating at timed intervals the galvanometer is alternately brought into circuit with one or another of the plurality of thermo-couples, the needles swinging when couple 11 is included in the galvanometer circuit to a position over a point on the chart where actual temperatures being taken is read, and swinging when couple 10 is included in the circuit to a position over the point on the chart corresponding to the firebox temperature. Simultaneously with the opening of the galvanometer circuit for one couple preparatory to closing the circuit for the other couple, the striker bar is forcibly actuated through the momentary closing of the circuit including the solenoid for actuating same, and a record made on the chart of the position of the needle. The striker bar immediately retracts and the circuit for the other couple is closed, permitting the needle to swing to its new position and after a time interval permitting the needle to assume a correct stationary position, the same operation takes place as with the first couple, and this action is repeated indefinitely with no further attention, except that required, say once a day, for winding the clockwork, inserting new charts in place of used charts, and the like.

Modifications and changes may be resorted to within the scope of my claims without departing from the spirit or principle of my invention.

I claim:

1. In a device for making temperature records of a source of heat, a thermal element so related to the source of heat as to encounter a temperature dependent upon but lower than that to be measured, a chart and recording means adapted to cooperate to produce a record of temperatures from the thermal element which would exceed the actual temperatures to be recorded, and compensating means associated with said chart and recording means adapted to substantially eliminate the temperature excess and produce a substantially correct record.

2. In a device for making record of fire box temperatures, an electro-thermal element so related to the firebox as to encounter a temperature dependent upon but lower than the firebox temperature, a chart and recording means adapted to cooperate to produce a record of temperatures which would exceed the firebox temperature, and resistance means in the element circuit of a magnitude to substantially eliminate such temperature excess and thereby produce a substantially correct record of the firebox temperature.

In testimony whereof, I have signed my name hereto.

FREDERICK D. POTTER.